(12) United States Patent
Leeds

(10) Patent No.: US 12,129,404 B1
(45) Date of Patent: *Oct. 29, 2024

(54) METHODS OF MAKING ADHESIVES CONTAINING POST-CONSUMER POLYMER

(71) Applicant: RS Industrial, Inc., Buford, GA (US)

(72) Inventor: Gabriela Agostini Leeds, Roswell, GA (US)

(73) Assignee: RS Industrial, Inc., Buford, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/313,215

(22) Filed: May 5, 2023

Related U.S. Application Data

(63) Continuation of application No. 17/027,470, filed on Sep. 21, 2020, now Pat. No. 11,685,845.

(60) Provisional application No. 62/972,378, filed on Feb. 10, 2020, provisional application No. 62/910,955, filed on Oct. 4, 2019.

(51) Int. Cl.
| | |
|---|---|
| *C09J 123/12* | (2006.01) |
| *C08J 11/22* | (2006.01) |
| *C08L 23/12* | (2006.01) |
| *C08L 91/06* | (2006.01) |
| *C09J 7/35* | (2018.01) |
| *C09J 191/06* | (2006.01) |

(52) U.S. Cl.
CPC ............. *C09J 123/12* (2013.01); *C08J 11/22* (2013.01); *C09J 7/35* (2018.01); *C09J 191/06* (2013.01); *C08J 2323/12* (2013.01); *C08L 23/12* (2013.01); *C08L 91/06* (2013.01); *C08L 2207/20* (2013.01); *C09J 2301/408* (2020.08)

(58) Field of Classification Search
CPC . C09J 123/12; C09J 191/06; C09J 7/35; C09J 2301/408; C08J 11/21; C08J 2323/12; C08L 91/06; C08L 23/12; C08L 2207/20
USPC ....................................................... 525/240
See application file for complete search history.

(56) References Cited

U.S. PATENT DOCUMENTS

| | | | | |
|---|---|---|---|---|
| 4,822,653 | A | 4/1989 | Kauffman et al. | |
| 7,059,760 | B2 | 6/2006 | Mehta et al. | |
| 7,132,382 | B2* | 11/2006 | McCullough | C08F 10/00 502/120 |
| 8,067,087 | B2* | 11/2011 | Katchko | B32B 27/10 428/354 |
| 8,828,271 | B2* | 9/2014 | Zhang | A61L 15/58 524/718 |
| 10,005,931 | B2 | 6/2018 | Alsoryai | |
| 2007/0254131 | A1 | 11/2007 | Shail et al. | |
| 2008/0113146 | A1* | 5/2008 | Wright | C08J 11/08 428/95 |
| 2008/0131649 | A1* | 6/2008 | Jones | D06N 7/00 428/95 |
| 2016/0298003 | A1* | 10/2016 | Alsoryai | C08F 216/06 |

OTHER PUBLICATIONS

Azizi, H. and I. Ghasemi. "Reactive extrusion of polypropylene: production of controlled-rheology polypropylene (CRPP) by peroxide-promoted degradation." Polymer Testing 23 (2004): 137-143.
Geiselman, Bruce. "Altered Chemistry." Recycling Today, May 2018. https://magazine.recyclingtoday.com/article/may-2018-plastics-recycling/recycled plastics-additives.aspx.
Herlambang, B. and S. Bramantika. "Controlling polypropylene rheological properties by promoting organic peroxide during extrusion with improved properties for automotive applications." (2019).
Kaali, Peter. "Adding Functionality to Hot-Melt Adhesives." Adhesives Magazine, Mar. 1, 2017. www.adhesivesmag.com/articles/95315-adding-functionality-to-hot-melt-adhesives.
Lin; et al., "Preparation and Compatibility Evaluation of Polypropylene/ High Density Polyethylene Polyblends." Materials 8 (2015): 8850-8859.
Moad; et al., "Aqueous hydrogen peroxide-induced degradation of polyolefins: a greener process for controlledrheology polypropylene." Polymer Degradation and Stability 117 (2015): 97-108.
Oromiehie, A.; et al. "Chemical Modification of Polypropylene by Maleic Anhydride: Melt Grafting, Characterization and Mechanism." International Journal of Chemical Engineering and Applications 5 (2014): 117-122.
Schmit, Amanda; et al. "Adhesives 201: Hot Melt Formulating Webinar." The Adhesive and Sealant Council Presentation May 21, 2014.
Shenoy; et al., "Melt Rheology of Polymer Blends from Melt Flow Index". International Journal of Polymeric Materials, 10: 3, (1984): 213-235. http://dx.doi.org/10.1080/00914038408080271.
Tzoganakis, Constantine. "Peroxide Degradation of Polypropylene during Reactive Extrusion." (1988).
Luperox by Arkema Peroxide Packet safety bulletin from Arkema Inc., 2007.
Luperox by Arkema Organic Peroxides, Storage Temperature, SADT and Storatge Stability information sheet from Arkema Inc., 2007.
"Getting a Grip with Better Hot Melts." Product guide from The Dow Chemical Company, Mar. 2008.
"Eastotac and Regalite hydrogenated hydrocarbon resin in metallocene packaging adhesives." Product sheet from Eastman Chemical Company, 2011.
Comprehensive Varox Peroxide Accelerator Product Guide from Vanderbilt Checmicals LLC, Apr. 18, 2012.
"Compatibilizers: Creating New Opportunity for Mixed Plastics." Report from SPI: The Plastics Industry Trade Association www.plasticsindustry.org/recycle May 2015.
Fischer-Tropsch Hard Waxes Product Guide, Sasol Performance Chemicals, Feb. 2018.
Compatibilizers. PolyGroup Inc. (2019)—Official Site. https://polygroupinc.com/products/compatibilizers.
A-C 16A Product Information Sheet, Honeywell International Inc., 2019.

(Continued)

*Primary Examiner* — Michael M. Bernshteyn
(74) *Attorney, Agent, or Firm* — Cook Alex Ltd.

(57) ABSTRACT

Adhesive and additive for adhesive made from post-consumer polypropylene.

22 Claims, No Drawings

(56) References Cited

OTHER PUBLICATIONS

A-C 573P Product Information Sheet, Honeywell International Inc., 2019.
A-C 617 Product Information Sheet, Honeywell International Inc., 2019.
"Select Antioxidant Stabilizers For Polypropylene." SpecialChem (2019) https://polymer-additives.specialchem.com/selection-guide/antioxidant-stabilizers-for-polypropylene.
DI-CUP Dicumyl Peroxide Technical Information from Arkema Inc. (Available for publication as of at least from Oct. 3, 2019).
Luperox DHBP Polymer Initiator by Arkema. Product marketing sheet distributed by Harwick Standard Distribution Corporation, harwickstandard.com (Available for publication as of at least from Oct. 3, 2019).

\* cited by examiner

METHODS OF MAKING ADHESIVES CONTAINING POST-CONSUMER POLYMER

This is a Continuation Application of U.S. application Ser. No. 17/027,470, filed Sep. 21, 2020, now U.S. Pat. No. 11,685,845, which claims the benefit of and priority to U.S. Provisional Application No. 62/910,955, filed Oct. 4, 2019, and U.S. Provisional Application No. 62/972,378, filed Feb. 10, 2020, all of which are hereby incorporated herein by reference.

DESCRIPTION

Technical Field

The present disclosure generally relates to additives for adhesives and adhesives that contain post-consumer polypropylene. In particular, the present disclosure relates to additives for hot melt adhesives and hot melt adhesives that contain post-consumer polypropylene. The present disclosure also relates to methods of making additives and adhesives with post-consumer polypropylene.

Background

Adhesives are used in a wide variety of commercial applications such as product packaging and assembly. For example, in the food packaging industry, hot melt adhesive may be used to seal cartons and packages. When hot melt adhesive is used, it may be applied to a carton or package in a molten state. The carton or package may be closed and the hot melt adhesive cools to form an adhesive layer that seals the carton or package and maintains it in a closed state.

There has been a push to use post-consumer (recycled) materials for product packaging and assembly. For example, there has been a push for cartons and packages to be made from post-consumer paper, cardboard, plastic, glass, etc.

There remains a need for adhesive additives, adhesives and methods of making the same, wherein the adhesive additives and adhesives include post-consumer materials.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a method of making hot melt adhesive includes degradation of polypropylene polymer, such as post-consumer polypropylene. The degradation may be controlled degradation and may include lowering of the overall average molecular weight and/or narrowing the molecular weight distribution (controlled rheology) of the polypropylene. The polypropylene then is mixed with one or more of antioxidant(s), polymer(s), wax(es), adhesion promoters, and tackifying agent(s) to thereby form the hot melt adhesive. The polymer may be one or more of metallocene(s), amorphous poly-alpha-olefin, ethylene vinyl acetate, polyethylene, polypropylene, and polyamide. The metallocene may be polypropylene or polyethylene.

In another aspect, a method of making hot melt adhesive includes chain degrading post-consumer polypropylene to form an additive including chain degraded post-consumer polypropylene. The additive is mixed with one or more of wax(es), polymer(s), adhesion promoters, antioxidant(s) and tackifying agent(s), thereby forming the hot melt adhesive.

In another aspect, a hot melt adhesive includes a post-consumer polypropylene, and one or more of wax(es), polymer(s), adhesion promoters, antioxidant(s) and tackifying agent(s).

In yet another aspect, a method of making an additive for a hot melt adhesive includes chain degrading post-consumer polypropylene to form an additive including chain degraded post-consumer polypropylene.

In a further aspect, an additive for a hot melt adhesive including post-consumer polypropylene having a melt flow index at 190° C. of at least 150 g/10 min, or at most 2000 g/10 min, or at most 1000 g/10 min, or between 150 g/10 min and 1000 g/10 min, or between 600 g/10 min and 1200 g/10 min, or between 800 g/min and 1000 g/min, or between about 900 g/min and 950 g/min.

In another aspect, an additive for a hot melt adhesive including post-consumer polypropylene having a viscosity between about 2,500 cps and about 100,000 cps at 190° C., as measured by a viscometer. In one embodiment, the viscosity may be between about 7000 cps and about 13,500 cps at 190° C. In another embodiment it may be about 10,000 cps at 190° C.

In another aspect, an additive for a hot melt adhesive includes post-consumer polypropylene, wherein the additive has a melt flow index at 190° C. of at least 150 g/10 min, or at most 2000 g/10 min, or at most 1000 g/10 min, or between 150 g/10 min and 1000 g/10 min, or between 600 g/10 min and 1200 g/10 min, or between 800 g/min and 1000 g/min, or between about 900 g/min and 950 g/min.

In another aspect, an additive for a hot melt adhesive includes post-consumer polypropylene, wherein the additive has a viscosity between about 2,500 cps and about 100,000 cps at 190° C., as measured by a viscometer. In one embodiment, the viscosity may be between about 7000 cps and about 13,500 cps at 190° C. In another embodiment it may be about 10,000 cps at 190° C.

In yet another aspect, a method of making hot melt adhesive includes mixing an additive comprising post-consumer polypropylene with one or more of wax(es), polymer(s), and tackifying agent(s), thereby forming the hot melt adhesive.

DETAILED DESCRIPTION OF THE ILLUSTRATED EMBODIMENTS

The embodiments disclosed herein are for the purpose of providing a description of the present subject matter, and it is understood that the subject matter may be embodied in various other forms and combinations not shown in detail. Therefore, specific embodiments and features disclosed herein are not to be interpreted as limiting the subject matter as defined in the accompanying claims.

The present disclosure discloses additives for adhesives, adhesives and methods of making the same, wherein the additives and adhesives include polypropylene, which includes copolymers thereof, and in particular post-consumer (PC) polypropylene (recycled polypropylene). The polypropylene also my include impurities, such as polyethylene or impurities from a recycling process. The adhesives may be any suitable adhesive, such as hot melt adhesives and pressure sensitive adhesives. The hot melt adhesives may be, for example, polypropylene or polyethylene metallocene hot melt adhesives, amorphous poly-alpha-olefin (APO/APAO) hot melt adhesives or ethylene vinyl acetate (EVA) hot melt adhesives.

Polypropylene is one of the most popular polymers used in packaging materials. For example, polypropylene is used to make margarine containers and yogurt cups, flexible food and clothing packaging, bottles and bottle caps, etc. PC polypropylene is polypropylene that has been collected from one product and recycled for use in future products. PC polypropylene may have different ratings or grades. In one embodiment, the PC polypropylene that is used in the additives and adhesives described herein is rated for food grade. For example, the PC polypropylene may be used for FDA indirect Food Contact Grade.

The additive includes PC polypropylene that has undergone chain degradation. Chain degradation of the PC polypropylene may be conducted by any suitable process. In one embodiment, the degradation of the PC polypropylene may include visbreaking the PC polypropylene. For example, degradation of the PC polypropylene may be by chain scission with a peroxide initiator. In an alternative, the degradation may include reacting the PC polypropylene with hydroxyl amine ester.

The starting melt flow index of the polypropylene is typically about 3-30 g/10 min before undergoing chain degradation. After chain degradation, in one embodiment, the additive and/or the chain degraded PC polypropylene in the additive has a melt flow index at 190° C. of at least 150 g/10 min, or at most 2000 g/10 min, or at most 1000 g/10 min, or between 150 g/10 min and 1000 g/10 min, or between 600 g/10 min and 1200 g/10 min, or between 800 g/min and 1000 g/min, or between about 900 g/min and 950 g/min. The melt flow index may be determined by ASTM-D1238.

Furthermore, the viscosity of the additive and/or the chain degraded PC polypropylene in the additive may be between about 2,500 cps and about 100,000 cps at 190° C., as measured by a viscometer. In one embodiment, the viscosity may be between about 7000 cps and about 13,500 cps at 190° C. In another embodiment it may be about 10,000 cps at 190° C.

When chain degraded by free radical initiation, the PC polypropylene may be heated and mixed with inorganic or organic peroxide. In one embodiment, the peroxide may be one or more of dicumyl peroxide, 2,5-dis(tert-butylperoxy)-2,5-dimethylhexane, bis(2,4-Dichlorobenzoyl) peroxide, Di(tert-butylperoxyisopropyl)benzene, and cumene hydroperoxide. The peroxide may be technically or substantially pure. It also may be stabilized with a stabilizer, such as polyolefin carrier or diluted with various solvents, such as mineral oil. The peroxides may be, for example, Luperox 101 or Luperox DBPH. When a stabilized peroxide is used, it may be Polyvel PCL-15, Polyvel PC-05, Polyvel CR20PX2, Pollyvel S-2673, or Struktol VMO. Furthermore, the stabilized peroxide may be in pellet, liquid form or granule form.

In one method, the peroxide to PC polypropylene weight ratio may be between about 1:9,999 and 17:33. For example, the peroxide may be in an amount between about 0.01 wt % and about 34 wt %, and the PC polypropylene may be in an amount of between about 66 wt % and about 99.99 wt %, relative to each other. Other agents also may be present, such as a peroxide stabilizer, if one is used. In another alternative method, the peroxide may be in an amount of less than about 5 wt % and the PC polypropylene may be about 95 wt %, relative to each other (i.e., 1:19 weight ratio). In another embodiment, the peroxide may be in an amount between about 2 wt % and about 5 wt %, and the PC polypropylene may be in an amount between about 95 wt % and about 98 wt %, relative to each other (i.e., 1:19 to 1:49 weight ratio). In another embodiment, the peroxide may be in an amount of about 3 wt % and the PC polypropylene may be in an amount of about 97 wt %, relative to each other (i.e., about 1:32 weight ratio). In yet a further embodiment, the peroxide may be between about 0.5 wt % and 2.5 wt %, and the PC polypropylene may be between about 97.5 wt % and about 99.5 wt %, relative to one another (i.e., 1:39 to 1:199 weight ratio). The peroxide is sufficient to chain degrade the PC polypropylene to form an adhesive additive that includes chain degraded PC polypropylene having a melt flow index as described above.

During chain degradation of the PC polypropylene, the PC polypropylene and peroxide may be heated to a temperature between about 250° F. and about 600° F., or higher, and mixed. In one embodiment, the mixture may be heated to a temperature of about 300° F. For example, the mixing is performed until the desired melt index is reached, which may take from 1 minute to 45 minutes depending on such factors, but not limited to, the type of peroxide and the temperature of the mixture. During the mixing, an initial amount of peroxide may be mixed with the PC polypropylene and then an additional amount of peroxide may be slowly added to the mixture during stirring. In one embodiment, the mixture is stirred mechanically.

During the stirring of the mixture, the peroxide reacts with the PC polypropylene to chain degrade the PC polypropylene and form an adhesive additive including the chain degraded PC polypropylene. The peroxide initiates free radical chain scission of the PC polypropylene to make a lower molecular weight polypropylene. In one embodiment, optionally, an antioxidant is added to the mixture after about 80% to about 99.9% decomposition of the peroxide. The antioxidant may be any suitable antioxidant. For example, the antioxidant may be one or more of pentaerythritol tetrakis(3,5-di-tert-butyl-4-hydroxyhydrocinnamate), tris(2,4-ditert-butylphenyl) phosphite, octadecyl-3-(3,5-di-tert-butyl-4-hydroxyphenyl)-propionate, and butylhydroxytoluene.

Once the additive is formed, it may be immediately used as an adhesive additive. Alternatively, it may be cooled and formed into pellets for later use.

In one embodiment of making an adhesive, the above described additive including chain degraded PC polypropylene is mixed with one or more of wax, polymer, tackifying agent, and antioxidant. The polymer may be polypropylene or polyethylene metallocene(s), amorphous poly-alpha-olefin (APO/APAO), polyethylene, polypropylene, polyamide or ethylene vinyl acetate (EVA). The wax may be any suitable wax, such as a microcrystalline, paraffin wax, fisher tropsch, polypropylene based waxes, or waxes with maleic anhydride. In one method, the wax may be one or more of Sasol H8, Fisher Tropsch Wax, Honeywell A-C 16, Honeywell A-C 617, Honeywell A-C 573P, Sasol 5603, Sasol 5803, Sasol M3000, and Sasol M2F. In one method, the wax may be a blend of Sasol H8 and paraffin. In one embodiment, the blend may be about 50 wt % Sasol H8 and about 50 wt % paraffin.

When a tackifying agent is included, the agent may be any suitable tackifying agent. For example, the agent may be one or more of C5 and C9 hydrocarbon resins or blends thereof. In one embodiment, the tackifying agent comprises hydrogenated resins, rosin ester, rosin acid or a terpene. For example, the tackifying resin may be one or more of Eastotac H-100R, Eastotac H-100L, Regalite R1100, Regalite R1125 and Eastotac H-130W.

In one method of making an additive and a hot melt adhesive in a continuous process, the starting materials may be used in the following proportions relative to one another:
- PC polypropylene in an amount of between 10 wt % and 60 wt %;
- peroxide in an amount of between about 0.1 wt % and about 5 wt %;
- wax, optionally, in an amount of between 0 wt % and 50 wt %;
- tackifying agent, optionally, in an amount of between 0 wt % and 50 wt %;
- polymer, optionally, in an amount of between 0 wt % and 90 wt %; and
- antioxidant, optionally, in an amount of between 0 wt % and 5 wt %.

In an embodiment of making a hot melt adhesive, the below listed materials may be in the following proportions relative to one another in the starting materials and in the hot melt adhesive:
- Adhesive additive including chain degraded PC polypropylene, as described above, in an amount of between 10 wt % and 60 wt %;
- wax, optionally, in an amount of between 0 wt % and 50 wt %;
- tackifying agent, optionally, in an amount of between 0 wt % and 50 wt %;
- polymer, optionally, in an amount of between 0 wt % and 90 wt %;
- antioxidant, optionally, in an amount of between 0 wt % and 5 wt %.

The hot melt adhesive includes a PC polypropylene and wax(es), polymer and tackifying agent(s). The hot melt adhesive could include other agents and additives as well. The hot melt adhesive also may contain by-products of visbreaking with a peroxide, such as one or more of acetophenone and α-cumyl alcohol.

The hot melt adhesive may include:
- PC polypropylene in an amount of between 10 wt % and 60 wt %;
- wax, optionally, in an amount of between 0 wt % and 50 wt %;
- tackifying agent, optionally, in an amount of between 0 wt % and 50 wt %;
- polymer, optionally, in an amount of between 0 wt % and 90 wt %;
- antioxidant, optionally, in an amount of between 0 wt % and 5 wt %.

In a method of making a hot melt adhesive, the additive including chain degraded PC polypropylene may be added to an already existing hot melt adhesive.

In another method of making an additive or a hot melt adhesive PC polypropylene, and peroxide may be metered into the twin screw extruder by pump or mechanical flow regulator. Peroxide, such as any of those mentioned above, may be metered at approximately 1% of PC polypropylene volume by weight. The twin screw has a temperature profile beginning with the highest temperature (between 450° F.-600 F) and ramping down to approximately 275° F. Temperature ramping can be selected based on residency time of material in the twin screw dictated by RPM of twin screw and size of twin screw used. For example, when using a 27 MM twin screw extruder at a rate of 200 lbs/hr of PC polypropylene, the ramping may include beginning at 600° F. and going down to 300° F., through the course of 10 temperature zones. The number of temperature zones may vary depending on the process and equipment. The blended material is then extruded and cooled. The material can be cooled to a pellet (galla, strand or other pellet form) or extruded directly into a drum. Alternatively, additive can be extruded into a kettle to immediately be blended to form final hot melt adhesive formulation.

EXAMPLE

In one example of making a hot melt adhesive containing post-consumer polypropylene, post-consumer polypropylene and approximately 20% of the total amount of dicumyl peroxide are stirred in a mixing container and heated to 300° F. The remaining dicumyl peroxide is slowly added to the heated polymer while being mechanically stirred for 18 to 45 minutes or until 99.9% of the dicumyl peroxide has decomposed. This may be calculated as theoretical 10 half-lives of the dicumyl peroxide at a processing temperature of 340° F. The weight ratio of the total amount of dicumyl peroxide to the total amount of post-consumer polypropylene is between about 2:98 to about 5:95.

Antioxidant is then added to the heated mixture and stirred. Wax, tackifying agent, and formulated metallocene, APO/APAO, or EVA HMA may be slowly and stepwise added to the mixture while being mechanically stirred at 300° F. Once all ingredients have been added the mixture may be stirred for an additional 30 minutes to 2 hours. Optionally, the mixture may be filtered, by for example, mechanical filtering. The mixture is then cooled to form a hot melt adhesive including post-consumer polypropylene.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A method of making hot melt adhesive, comprising:
   mixing a chain degraded post-consumer polypropylene with one or more of a polymer(s), wax(es), adhesion promoters, antioxidants, and tackifying agent(s); and
   cooling the mixture, thereby forming a hot melt adhesive.

2. The method of claim 1, further comprising chain degrading a post-consumer polypropylene.

3. The method of claim 2, wherein the chain degrading of the post-consumer polypropylene comprises visbreaking the post-consumer polypropylene.

4. The method of claim 2, wherein the chain degrading of the post-consumer polypropylene comprises lowering an overall average molecular weight of the post-consumer polypropylene.

5. The method of claim 2, wherein the chain degrading of the post-consumer polypropylene comprises narrowing a molecular weight distribution of the post-consumer polypropylene.

6. The method of claim 5, wherein the molecular weight distribution of the post-consumer polypropylene is narrowed by free radical chain scission.

7. The method of claim 2, wherein the chain degrading of the post-consumer polypropylene comprises reacting the post-consumer polypropylene with a peroxide.

8. The method of claim 7, wherein the chain degrading of the post-consumer polypropylene comprises heating the post-consumer polypropylene and reacting the post-consumer polypropylene with the peroxide.

9. The method of claim 8, wherein during the chain degrading of the post-consumer polypropylene, the peroxide and the post-consumer polypropylene are in amounts relative to each other, wherein the peroxide is in an amount of at most about 5 wt % and the post-consumer polypropylene is in an amount of at least about 95 wt %.

10. The method of claim 2, wherein during the chain degrading of the post-consumer polypropylene, the post-consumer polypropylene is heated to between about 250° F. and about 600° F.

11. The method of claim 2, wherein during the chain degrading of the post-consumer polypropylene, the post-consumer polypropylene is heated to about 300° F.

12. The method of claim 7, wherein the peroxide comprises organic peroxide.

13. The method of claim 7, wherein the peroxide comprises one or more of dicumyl peroxide, 2,5-dis(tert-butylperoxy)-2,5-dimethylhexane, bis(2,4-dichlorobenzoyl) peroxide, di(tert-butylperoxisopropyl)benzene and cumene hydroperoxide.

14. The method of claim 2, further including adding an antioxidant to the post-consumer polypropylene during chain degrading of the post-consumer polypropylene.

15. The method of claim 1, wherein the polymer comprises one or more of metallocene(s), amorphous poly-alpha-olefin, ethylene vinyl acetate, polyethylene, polypropylene, and polyamide.

16. The method of claim 1, wherein the wax comprises microcrystalline or paraffin wax.

17. The method of claim 1, wherein the tackifying agent comprises one or more of C5 and C9 hydrocarbon resins or blends thereof.

18. The method of claim 1, wherein the tackifying agent comprises one or more of hydrogenated resins, rosin ester, rosin acid or terpene.

19. The method of claim 14, wherein the antioxidant comprises one or more of pentaerythritol tetrakis(3,5-di-tert-butyl-4-hydroxyhydrocinnamate), tris(2,4-ditert-butylphenyl) phosphite, octadecyl-3-(3,5-di-tertbutyl-4-hydroxyphenyl)-propionate, and butylhydroxytoluene.

20. The method of claim 1, wherein:
the post-consumer polypropylene is in an amount of between 10 wt % and 60 wt %;
the wax is in an amount of between 0 wt % and 50 wt %;
the tackifying agent is in an amount of between 0 wt % and 50 wt %;
the polymer is in an amount of between 0 wt % and 90 wt %; and
the antioxidant is in an amount of between 0 wt % and 5 wt %.

21. The method of claim 1, wherein the chain degraded post-consumer polypropylene has a melt flow index at 190° C. of at least 150 g/10 min.

22. The method of claim 1, wherein the chain degraded polypropylene has a viscosity between about 2,500 cps and about 100,000 cps at 190° C.

* * * * *